June 23, 1970        A. B. MEYER        3,516,389
EXPERIMENTAL MODULAR ANIMAL MAZE
Filed Feb. 12, 1968        3 Sheets-Sheet 1
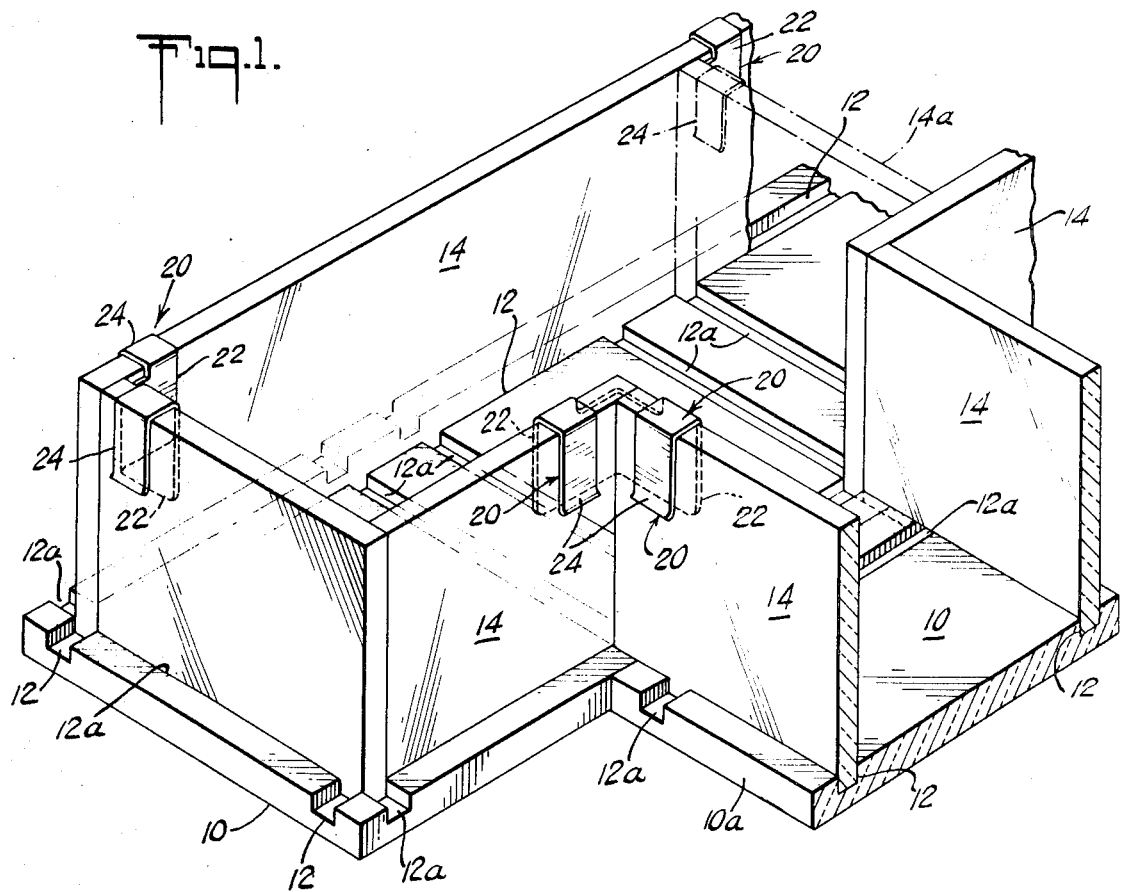
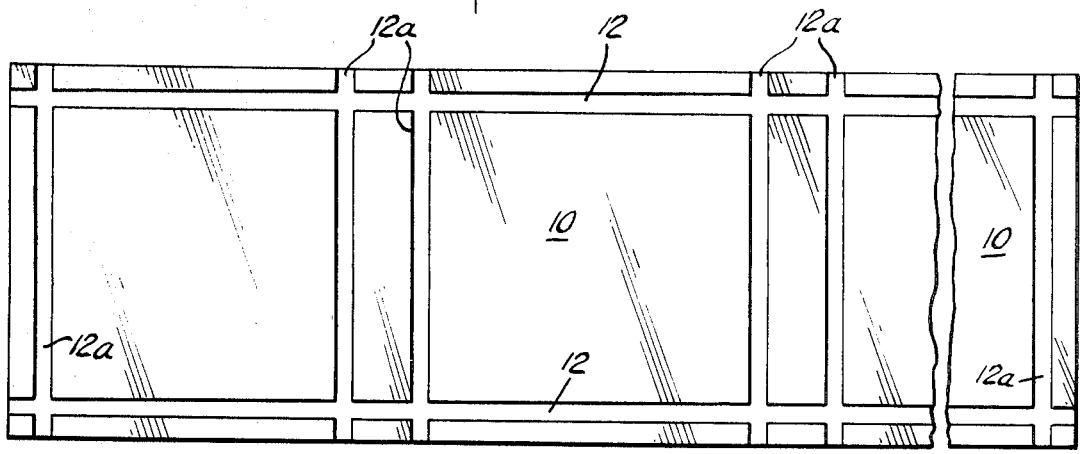
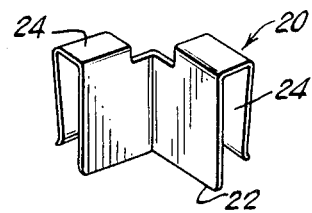
INVENTOR
ARTHUR BRACKETT MEYER
BY
Curtis Morris & Safford
ATTORNEYS.

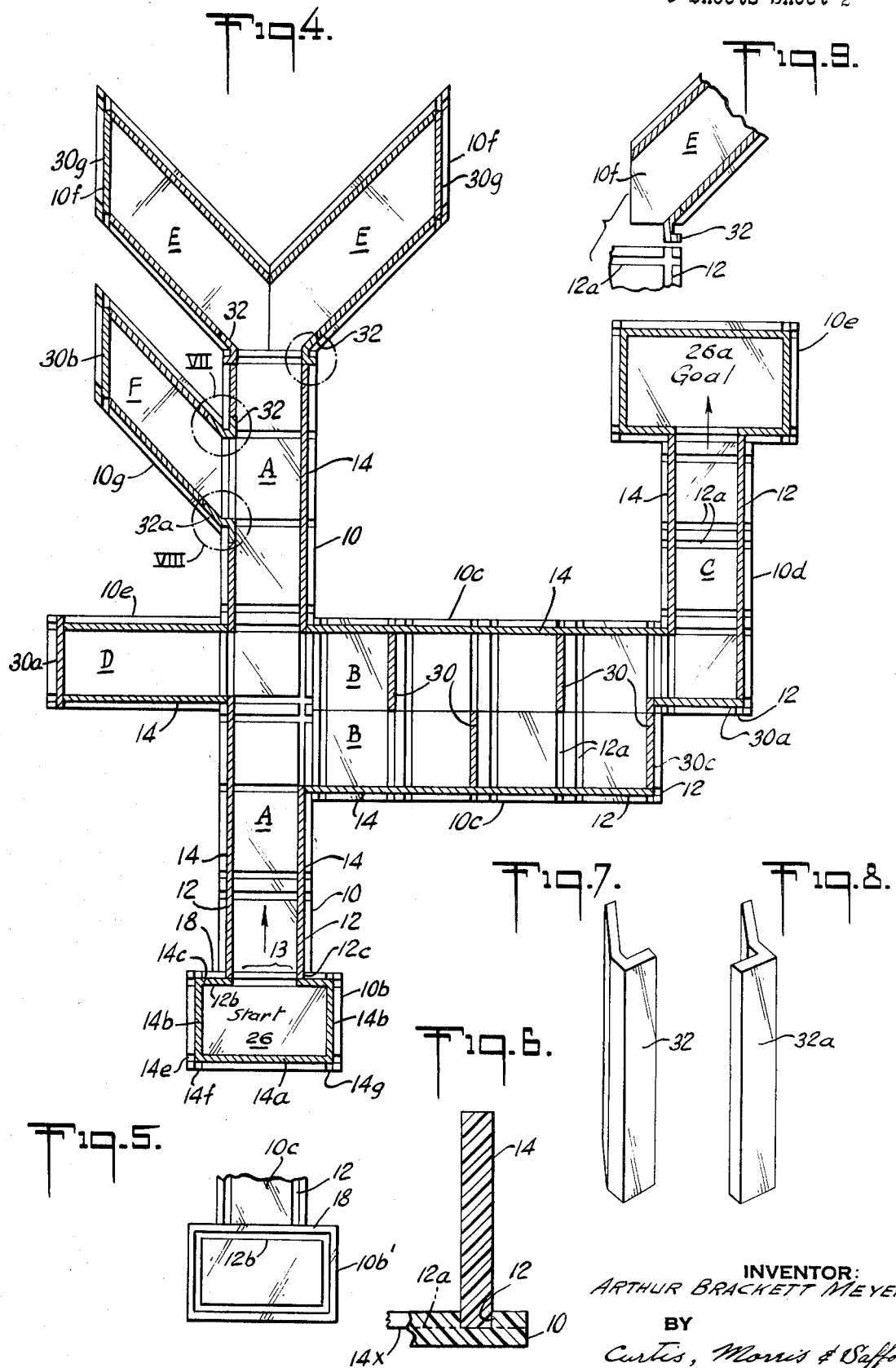

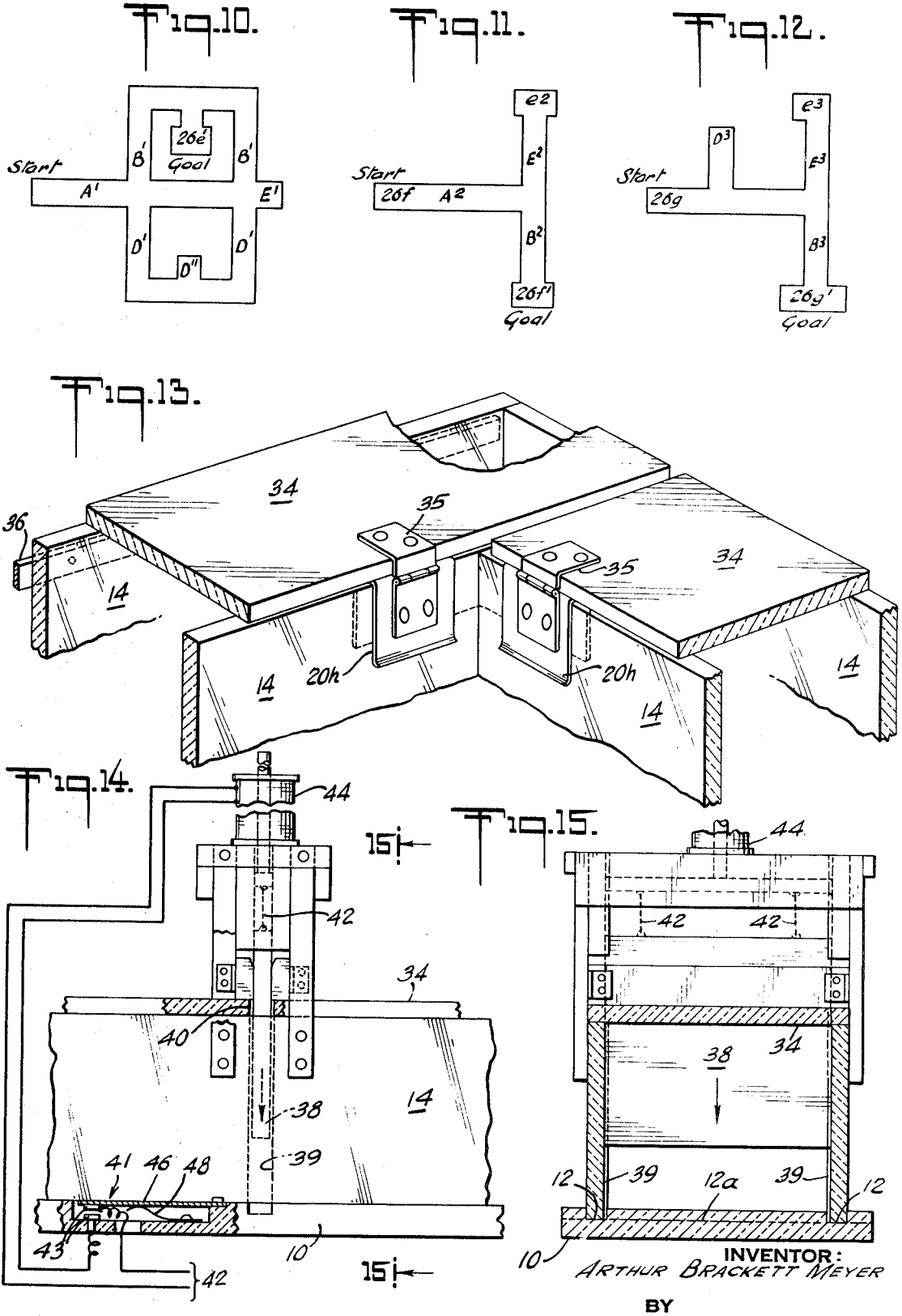

United States Patent Office 3,516,389
Patented June 23, 1970

3,516,389
EXPERIMENTAL MODULAR ANIMAL MAZE
Arthur Brackett Meyer, 380 S. Winooski Ave.,
Burlington, Vt. 05401
Filed Feb. 12, 1968, Ser. No. 704,758
Int. Cl. A01k 15/00
U.S. Cl. 119—1                                6 Claims

ABSTRACT OF THE DISCLOSURE

An experimental maze apparatus having modular units for base and walls and, if desired, for roof and ceiling, the base units being slotted accurately to a width equal to the thickness of the wall units so that the wall units can be pushed into the slots and will be held thereby in proper position. The top edges may be secured by spring clips. Likewise, the ceiling or roof units may be secured to and advantageously hinged on similar clips which engage by friction and spring pressure at the top of the vertical wall units. Automatic doors and other auxiliary equipment for the animal behavior experiments can also be provided.

---

This invention relates to modular structures which can be readily assembled and disassembled and stored and transported with economy of space; and especially to structures which are transparent and nonretentive of odors, etc.; and to modular parts which can be thus assembled into various structures.

In behavioral psychology it has become common practice to use special runways and mazes in which experimental animals are allowed to run or wander, with restricted space providing limited choices, and in some cases presenting rewards or penalties at various locations. The experimenter watches or records the times and behavior patterns, etc. In general, such mazes have been made to particular designs and requirements for particular experiments; and, once used, these structures have had to be thrown away as useless for further experiments of the same kind. The experimental animals, most often rats, show certain behavior characteristics while exploring the maze, and these may be modified by changing the pattern of runways or the surface character of their floors or walls, or by various sights and/or smells and/or tactile sensations which may be encountered along the runways. The experimenter is interested in which ways the animals turn, how far they go before retreating and what they examine and what they avoid. In all this, the animals should be unguided if the results are to be significant.

After the maze equipment has been once used, the odor of animals who have gone through it before will tend to attract or repel any animals that are put in for a particular experiment and thus to control their behavior; so it has been considered unwise or impossible to run a second experiment in the same maze structure.

I have now found that it is possible, if one uses for the structures, such as animal mazes, etc., a dense, non-adsorbent material, such as glass or plastic, so thoroughly to clean the maze structure that no guiding or distracting odor remains; but there still remains the problem of joints and crevices in which odorous material may be caught and held. Thus, it had seemed that only a one-piece molded maze, which could be put into a power washer and thoroughly cleaned after each experiment, could be reused. However, such one-piece structures are not feasible where different mazes are needed for different experiments, as the making of molds is too expensive.

Another reason for eliminating odors before starting such experiments is that the experimenter often wants to observe the behavior of the animal when it is trying to get to a reward by the shortest possible route; and any odors on the walls or floor of the maze may distract the animal or aid it in reaching the goal and thus will interfere with the reliability of the experimental data obtained.

Experimental mazes have heretofore been made of wood, both because of the need for a readily available and easily workable material capable of being adapted to whatever design and conditions the experimenter wishes to establish, and because of the need for economy.

It is understood that mazes made of dense, odorless materials, especially plastics, which can withstand thorough washing in conventional washing machines and with effective washing compounds, will give superior experimental results. Because of the greater expense of such materials, however, it is not feasible to merely substitute them for wood in the ordinary experimental laboratory procedure of having each maze made up from fresh material for each experiment.

According to the present invention, modular units are preformed of such plastic material with means for interfitting so that they can be assembled into an infinite variety of forms of maze and with the necessary accessory equipment for the various experiments. Such units can be supplied in any of a wide variety of dimensions and can be assembled in an infinite number of ways to accommodate almost any maze experiment which may be conceived for particular types of animal behavior. Moreover, the maze can be changed at any time, so that the animals cannot carry over familiarity with it from one experiment to the next.

In the accompanying drawings, I have shown an early embodiment of my invention and several alternatives.

These are chosen and included here with a view to explaining the invention and its principles so that others skilled in the art can make full use of it, and will be enabled to make substantial changes and substitutions within the scope of the invention and while still adhering to the essential nature of the disclosure.

FIG. 1 is an isomeric view of a fragment of a maze embodying the present invention and which may serve to define an alley in the maze.

FIG. 2 is a plan view of one of the modular units of FIG. 1 which can be assembled into a maze, only a part of the maze being shown in this figure.

FIG. 3 is an isomeric detail view showing a standard corner fixture, and a connector, which may be identical at all corners.

FIG. 4 is a plan view similar to FIG. 2 but on a smaller scale to show a more elaborate maze.

FIG. 5 is a fragmentary plan view of a different end box.

FIG. 6 is a fragmentary cross section showing a wall plate, upright, engaged in a groove in a base plate.

FIGS. 7 and 8 are isometric views of adaptor posts used, as shown on FIGS. 4 and 9, where a side alley goes off at an oblique angle.

FIG. 9 is a fragmentary detail, top plan view similar to FIG. 4, showing a fragment of a maze, in which a side alley goes off at an obtuse angle from the main alley.

FIGS. 10, 11 and 12 are diagrammatic showings of different illustrative maze forms; and FIG. 13 shows a hinged top and mounting for use where the animals might jump or climb out of the runways; the cover is partially broken away in this figure to expose a wall fitting extending along the top of the wall for mounting of accessories, such as sliding doors, electrical or electronic equipment, etc.

FIGS. 14 and 15 are fragmentary views in longitudinal and cross section, respectively, of a portion of a maze having an electric gate.

The invention uses a base 10 of any desired dimensions made with precision grooves 12 herein sometimes referred to as trenches, formed or cut in and extending along, but spaced from its longitudinal edges far enough to give structural strength, just wide enough to tightly engage the edge portion of the wall plate 14, herein sometimes referred to as a panel and deep enough to hold it in upright position.

Transverse grooves 12a are advantageously also formed, as shown, so that end wall plates can be inserted at will, to block off main runways, or to form side alleys. Wall plates can be fixed in grooves 12 and 12a and and 12a may be lined up with the grooves 12 of a side alley on another base 10a, FIG. 1, or 10c, FIG. 4. The walls of such alleys will be continuous from the side alley base unit 10a across the main alley 10; and these may be extended at will, going around corners and, in many cases, having alleys arranged as T's or crosses to present the animal with frequent choices, where another alley opens out at an intersection.

Ordinarily, these side alley units 10a, b, c, etc., will have perpendicular ends so as to form a 90° abutment; but if desired, they may be at another angle, e.g., as illustrated by FIGS. 4, 7, 8 and 9; and in such cases, some of the cross grooves will advantageously be at the same angle, so that when these side alley base members are in position, they can be held in aligned position by vertical wall plates 14 extending across the main alley and along the side alley and engaging in these grooves.

In the preferred embodiment, each alley is built upon a base. Each such base is made of plastic, advantageously polystyrene, or poly methyl (or ethyl) methacrylate, or poly carbonate, etc., plates of sufficient thickness to remain upright and resist forces imposed thereon by the animal, so that when the groove, as indicated at 12, is formed in the plate 10, the groove should have sufficient depth and structural strength to hold the side walls 14 in an upright position.

The widths of the grooves 12 are accurately fitted to the thickness of the walls 14 so that the walls can be inserted into grooves 12 with a tight fit and will be held in position thereby. These grooves are best shown in FIGS. 1 and 6.

In addition to the side grooves 12, transverse grooves 12a may be provided and, as shown, the spacing of these grooves from each other and from the edges of the base is such that identical alley bases can be abutted against the side, and the side grooves 12 will align exactly with the transverse grooves 12a. In this position, a side wall plate 14 fitted into the grooves of the abutting base will also engage in the grooves 12a and thus secure the two bases together in the desired relation as a panel in a wall of the runway.

In one example which I have used effectively, I use a plate of transparent rigid polystyrene which measures 0.34 in. thickness. This is grooved on lines parallel to the sides, but spaced therefrom about 15/64 in. and each groove being about 15/64 in. wide. In addition, transverse grooves 12a of the same width are provided near the ends of the plate, and 2¾ in. from other transverse grooves 12a. Into these grooves are fitted side wall plates 14 of rigid polystyrene. These latter plates are 15/64 in. in thickness, 3 in. high, 3¼ in. wide, and are fitted respectively into grooves 12 and 12a. The plates and grooves are so nearly the same dimension that the side wall panels 14, 14a, etc. are securely engaged by friction and each distorts the base plate at the groove just enough to assure a good grip which will hold the side wall plates upright. (See FIGS. 1, 6 and 15.)

In many cases this fitting together of upright plates into the grooved base may be sufficient for the maze or other structure, but ordinarily—especially if animals are to be run in the maze—I prefer to reinforce the structure, e.g., by sping clips 20 which may frictionally engage on the top edges of the plates 14. These clips are formed of resilient sheet metal, or similar material, bent down over their own legs to a U-cross section, with slightly curved ends to facilitate entry of the edges of the side plates (see FIGS. 1 and 3). The backs 22 (i.e., parts which depend from the tops of the clips in flat engagement with the back faces of the side wall plates) are integral for two or more plates, whereas the pressing, or apron, portions 24, extend over the edges of the side plates and down against the opposite side, with portions cut out (see FIG. 3) so that the backs 22 can be bent to fit a corner and the clip portions engage the plates on opposite sides of the corner. In the case of plates abutted end-to-end, or side-to-side, however, this cutout is not necessary.

These reinforcing clips may be made for inside corners (as shown at the left on FIG. 1 and in FIG. 3) or for outside corners (as shown in the center foreground of FIG. 1); or they may be made in a straight U-channel form for holding abutted plates in mutual alignment, in which case the apron portion may be coextensive longitudinally with the back, i.e., omitting the cutout.

The simplest runway structure utilizing the present invention consists of a base 10 provided with the grooves 12 and the upright wall plates 14 engaged in said grooves, as illustrated by FIGS. 1, 2 and 4. However, generally one needs a somewhat more sophisticated maze structure, such as are illustrated by FIGS. 4–11.

FIG. 4, for example, shows at the end of the maze a starting box 26, which may be built of a grooved base 10b and fitted end plates 14a, 14b and 14c as described above, but is preferably prefabricated into a unitary peripheral wall which fits into peripheral grooves 12a, 12b and 12c, respectively in the base 10b, to give a box of a standard predetermined size.

One wall of the box has a gap 13 which forms the exit; and, at the points adjacent the exit, transverse grooves 12c extend through the border 18 to connect the peripheral grooves 12b on the base 10b with the longitudinal grooves 12 on the adjoining runway base 10c. At opposite sides of this gap the base 10b has intersecting grooves located to be aligned with the longitudinal grooves 12 of an abutting runway base 10c. The walls 14 fitted into these grooves extend from the inner sides of the grooves across the border 18 and on along the grooves 12 of the adjoining base 10c, and thus tie the two bases together by their grip on the common wall plate 14 engaged in both the base 10b and the base 10c.

This box can be connected into the runway at any appropriate point by merely leaving a gap in the wall 14 or 30 of the runway and extending wall units across the boundary to the gap or "doorway" 13 of the box.

FIG. 4 shows one type of maze, out of a very large number which could be cited. It should be taken as representative, realizing that each user may make a different arrangement as he desires. In the case illustrated, the first runway A goes off from the starting box in a straight line, but presently it is joined from the right by a double runway B—B which has baffle walls 30 extending into, but not entirely across the runway, and, at its end, one of these walls 30 closes off the left-hand runway, while the right runway is left open at its end into a third runway C. This third runway also consists of a base 10d with grooves 12 at its sides and 12a across it, and connected to a goal box 26a which may contain a reward to apprise the animal that it has succeeded.

Another runway D joins the main runway A on the opposite side from B—B. This is shown as a simple straight base 10e with vertical side walls 14 and an end wall 30a. The wall of the main runway A is left open where the side alleys B—B and D connect, and the side walls 14—14 abut at right angles at each corner to give a tight wall and they may be secured by clips 20 as shown in FIG. 1.

A fifth runway E extends obliquely at each of opposite sides at the end of runway A. Together these open into the end of the main runway.

In the example shown a sixth runway F branches off to the left from the main runway A.

These various runways and branches are selected according to the experiment to be performed. It is an advantage of my invention that a great variety of forms can be made, but it should be remembered that the invention in its broad concept is not limited to any particular form.

When initiating a use of the invention, one first lays out the base panels 10, 10b, 10c, 10e, 10f, 10g, etc., in the arrangement which will provide the runways desired and when the grooves 12, 12c, etc. aligned where the walls 14 of the runways are to be. The wall panels and baffles, 14, 30, 30a and the start box 26 and the goal box 26a and the corner strips 32 and 32a (FIGS. 4, 7, 8 and 9) are all lined up edge to edge, with their respective grooves 128, 12a, 12c, etc. and then pushed down to the bottom of the grooves so that they are frictionally and resiliently engaged and held upright as shown, for example, in FIGS. 1, 2, 4 and 6, on any of a wide variety of patterns, as illustrated for example by FIGS. 10, 11 and 12. Finally, the edge clips 20 are pushed down onto the walls where necessary to hold them in the desired relation, especially for the baffle plates 30c and the end plates 30b and 30a.

Reference has been made to the transverse grooves 12a. As shown, these may be provided at regularly spaced intervals in the floor panels 10, 10c, 10d, etc. The spacing is such that a side alley floor plate can be abutted at right angles to a plate 10 or 10c with the grooves 12a on the main floor plate aligned with the longitudinal grooves on a side alley base plate 10c, etc.; and/or with the grooves of an oblique plate 10f or 10g meeting these transverse grooves.

In some cases open grooves may be considered objectionable, in which case plates should be used like 10e or 10f which are provided with grooves only where walls are required so that they will be filled tightly by the walls when in use; but that sacrifices some of the adaptability of the device described with the regularly spaced grooves. Filler strips 14x may be inserted to bring the grooves to floor level; and these strips can be removed for washing.

As shown in FIGS. 1, 2 and 4, the wall plates 14 are rectangular, and the grooves 12, 12a, etc., extend at least for the full length of the wall plates. In some cases, it may not be desirable to have grooves extend out to the edge of the base plate, in which case the wall plates may be notched at the bottom corner so as to fit onto the ungrooved edge part 18 of the base. Such a condition is illustrated in FIG. 5, where the base 10b' is wider than the alley, with which it is to connect and is designed to be used with any of a number of different alleys. In order to avoid having too many slots through the outer rim, side plates, not shown, which are mounted in the slots 12 will be notched at the end, bottom corner, as suggested above, so as to fit over the rim 18.

When a side alley is to extend from a main alley at an oblique angle, that may leave a narrow gap between the side wall units at the junction. If there is a gap at the junction, where side walls abut, one may improvise a seal with adhesive tape over the gap, but it is advantageous to have a tight butt joint between the units of the wall.

In FIGS. 4, 7, 8 and 9, I have shown pre-molded extruded strips 32 and 32a which take care of this problem by making the turn between the edges of standard rectangular wall plates with a tight butt joint to each as shown in FIGS. 4 and 9.

In FIG. 10 is shown a different arrangement of alleys for the maze. In this case, as in FIG. 4, the animal is started at one end of a straight alley A', and halfway down the alley there are intersecting alleys B' and D' on opposite sides. The alley B' leads to the goal box 26e', and its reward, whereas the opposite alley D' leads only to the blind alleys D" and E'. This figure shows only the plan; the structure would be essentially the same as used in FIG. 4, excepting for the arrangement of the parts to give the plan of the maze as shown.

FIG. 11 shows another plan which, like FIGS. 12 and 13, similarly uses structures such as are shown in FIGS. 4 and 10, but arranged to give the modified maze plans shown. In FIG. 11, the start is at 26f, and, as in the others, the runway goes off in a straight alley $A^2$, which at its end meets the side alleys $E^2$ and $B^2$ in T-formation. At the end of $B^2$ is the goal box 26f' with its reward; and at the end of $E^2$ is the negative rein $e^2$, which may offer chastisement. Similar parts are shown on FIG. 11 with similar reference characters, but in somewhat different arrangement.

In FIG. 13 is shown a top or roof slab 34 mounted on hinged fittings 35 and also an equipment bar 36 secured near the top on one of the plates 14h. This metal bar 36 serves for attachment of equipment, such as automatic doors, etc. and may be electrified so as to carry current for solenoids and small motors, etc.

As already mentioned the ceiling or roof plates 34 are advantageously hinged as at 35 to give ready access to the interior of the runways. For this purpose I preferably mount the hinges on spring clips 20h which extend down over the top of the side plates 14 in the same manner as indicated above in connection with the corner plates shown in FIG. 3 and on FIG. 1.

In FIGS. 14 and 15, I have shown a guillotine-type automatic door for the runway passage.

The vertically sliding door is shown at 38 on these figures. This door slides freely in the slots 39 and through a slit 40 in the roof. At its top the door 38 is engaged by a chain or cable 42 which is moved up and down by an electric motor 44 energized by the circuit 42 which is controlled to be normally open and to be closed by the weight of an animal by means of the switch 41 and the resilient plate 46. The motor shown at 44 is a simple magnetic motor, or solenoid which raises the gate 38 to which its armature is connected. However, this is only illustrative and it will be understood that a more sophisticated electric motor, or other type of motor, can be used to raise the guillotine gate.

A more sophisticated motor may be used to raise and lower the gates vertically or to swing down into or up out of the passageway instead of sliding, if they are hinged. There are many such motors available on the market and those skilled in the art will understand how they should be embodied in the applicant's apparatus.

When an animal approaches the door and finds the passageway obstructed his first response is likely to be of coming close and sniffing. In doing so he will probably step on the switch plate 42 which will then swing down deflecting spring 48 to close contacts 41 and energize the electric motor to lift the gate. This may alarm the animal so that he will run back, thereby releasing the switch plate and allowing the gate to drop back into its closed position. This may be repeated, probably several times, until the animal finally discovers that it can wait beside the door for it to open without suffering any adverse effects, and then can run through the door but when he gets on the other side, he will find that he cannot return and the door will not open by his scratching and/or poking his nose at it.

In some experiments it may be desirable to have a second switch plate on the opposite side of the door so that when he tries to return, he can cause the door to lift and run through, but ordinarily it is preferable to have only the one side as illustrated.

Instead of the floor plate 42 with its switch 41 other forms of response noting apparatus may be included. For example, there may be a pressure switch on the door itself so that if the animal tries to push through the door, it will be activated to open and it may be activated to open in an unexpected direction, as for example, to push against the animal or swing up beyond. Also, instead of a simple door the door 38 may be a mirror.

The track for the sliding door may be a groove or grooves cut into the plates 14 and 10; or it may be formed by spaced strips or metal angles secured to the side plates, between which the door plates 38 slide up and down.

It will be obesrved from what has been said above that the maze is entirely flexible and adaptable to any experiment by assembling the plates in different relations and they may also be disassembled and individually washed in soap and water or in a dish washing machine. Because the parts are all made of metal or plastic, they can be thoroughly cleaned and re-used. Advantageously, if plastic, they are made of a plastic which will withstand fairly high temperature so that, after washing, they can be dried by a flow of hot air which will remove not only the remaining moisture, but adherent odors.

The mazes can be assembled from modular units to which can be added at any time additional modular units and conventional accessory equipment such as automatic doors, automatic sensing devices to indicate the passage of the animal over a feeler mounted in or adjacent to the runway. Instead of an automatic door which drops into position across the runways, one may have a floodlight or spotlight or even an odor dispensing device all of which change the environment in response to the approach of an animal.

The device is easy to assemble into any of a large variety of maze patterns and it is also easy to dismantle and thus is thoroughly portable so that it can be stored in a relatively small space and readily carried from place to place between experiments.

The transparent walls permit the experiment to include changes of the environment by re-arrangement of materials adjacent but exterior to the walls and visible from the runways. To this end, various photographs or patterns printed on paper may be mounted on the exterior of these transparent walls.

Although I have shown the start box and the goal box as having one-piece molded sides, these may of course be assembled in the same manner as the runways from flat plates and held by the grip of slots in the base or by clips applied to the corners as in the case of the runways.

I claim:
1. A demountable animal observation enclosure which comprises:
   (A) a plurality of modular base plates arranged in abutting relation;
      (a) said plates having edges which abut tightly against edges of adjacent base plates and
      (b) having spaced longitudinal trenches spaced from one another and from the edges of the plates, and transverse trenches similarly spaced from one another and also spaced from the ends of the plates
         (i) said trenches being of substantial depth and
         (ii) each trench having substantially vertical sides and being of width sized to give a tight fit with the bottom edge portion of a wall panel when it is inserted therein;
         (iii) said trenches being oriented so that a plurality may be held in aligned and abutting realtionship by insertion of a common vertical wall panel in said channels of successive base plates;
   (B) wall panels of thickness sized to fit tightly into said channels and
      (a) at least one of said wall panels being of length to extend across a plurality of said transverse grooves and
      (b) at least one of said wall panels being shorter but adapted to extend across said base plate transversely and fit tightly in the transverse grooves.

2. A demountable experimental animal building set which comprises
   (A) a plurality of modular base plates arranged in abutting relation
      (a) each of said plates having longitudinal and transverse trenches therein of substantial depth and each of substantially uniform width sized to give a pressed fit with the bottom edge portions of a wall panel and oriented so that a plurality of said grooves are substantially aligned over a plurality of successive plates abutted with the end of one against another and a plurality of wall panels of thickness to give a pressed fit in said grooves and to be held in upstanding relation by engagement therein and of lengths respectively adapted to bridge the abutted ends of a plurality of successive base plates, thereby holding them releasably joined in aligned relation.

3. A demountable maze for observation of behavior of animals in enclosures, which comprises
   (A) a plurality of modular base plates arranged to serve as floor,
      (a) each of said plates having trenches extending along its face from its edges
      (b) said trenches being of substantial depth and of width substantially uniform and sized for tight engagement of the base plate at the sides of the trenches with the opposite faces adjacent the edges of panels hereinafter defined;
      (c) such trenches in adjacent plates being substantially aligned and in register, and
   (B) upstanding panels constituting walls
      (a) tightly engaged in said trenches of a plurality of the base plates
      (b) bridging across the abutting edges of said base plates and
      (c) held in upstanding position by tight engagement of said base plates at the sides of the trenches;
         said panels and said plates being substantially inflexible, dense and washable.

4. A maze as defined in claim 3 in which modular base plates are assembled in a common plane, with trenches in adjacent plates aligned, and a single wall panel is engaged in such a trench extending across the line of abutment of adjacent plates whereby to hold the orientation of said plates.

5. A building set as defined in claim 3 which further comprises corner clips of resilient material formed to engage the upper edges of two of said abutting panels and to hold said relation by resilient pressure.

6. A maze as defined in claim 3 in which two of said trenches are parallel and define between them a walled runway, and which further comprises top plates serving further to enclose the runway space, and hinges secured by spring clips on at least one of said wall panels on said top plates whereby said plates may be swung up from their normal positions for examining, removing and treating the animals.

References Cited

UNITED STATES PATENTS

| | | | |
|---|---|---|---|
| 2,880,001 | 3/1959 | Rosenzweig | 46—21 X |
| 3,087,732 | 4/1963 | Curran | 273—153 |
| 3,260,236 | 7/1966 | Jones | 119—1 |
| 3,294,239 | 12/1966 | Dayes | 119—5 X |

ALDRICH F. MEDBERY, Primary Examiner

U.S. Cl. X.R.

35—22; 46—21; 119—29; 273—153